United States Patent
Brevick et al.

(10) Patent No.: US 10,018,245 B2
(45) Date of Patent: Jul. 10, 2018

(54) PENDULUM CRANK BUMPER

(71) Applicant: Ford Global Technologies, LLC, Dearborn, MI (US)

(72) Inventors: John Edward Brevick, Livonia, MI (US); Jeffrey Eliot Chottiner, Farmington Hills, MI (US); Rick L. Williams, Canton, MI (US); Paul Edward Ostrander, Westland, MI (US); Frank Hanson, Westland, MI (US); Brian M. Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/708,182

(22) Filed: May 8, 2015

(65) Prior Publication Data
US 2016/0327119 A1    Nov. 10, 2016

(51) Int. Cl.
*F16F 15/14* (2006.01)
*F16F 15/28* (2006.01)

(52) U.S. Cl.
CPC .................. *F16F 15/283* (2013.01)

(58) Field of Classification Search
CPC ........... F16F 15/283; F16F 15/28; F16F 15/14
USPC ....................................... 74/574.2
See application file for complete search history.

(56) References Cited

U.S. PATENT DOCUMENTS

| | | | | |
|---|---|---|---|---|
| 2,332,072 A | * | 10/1943 | Gregory | F16F 15/145 74/604 |
| 2,584,384 A | * | 2/1952 | Galliers | F16F 15/1457 74/604 |
| 2,592,114 A | * | 4/1952 | Bynum | F16F 15/14 74/604 |
| 9,470,291 B2 | * | 10/2016 | Brevick | F16F 15/145 |
| 2014/0196568 A1 | * | 7/2014 | Pietron | F16F 7/1005 74/574.2 |

FOREIGN PATENT DOCUMENTS

| | | | | |
|---|---|---|---|---|
| DE | 102011100868 A1 | * | 11/2012 | ............ F16F 15/145 |
| DE | 102012210575 A1 | * | 12/2013 | ............ F16F 15/145 |

OTHER PUBLICATIONS

DE 102011100868 translation.*

* cited by examiner

*Primary Examiner* — Vicky A Johnson
(74) *Attorney, Agent, or Firm* — LeClairRyan

(57) ABSTRACT

A bumper for a pendulum that cannot inadvertently become loose is disclosed. The pendulum has at least one and preferably a pair of spaced apart, elongated bumpers. The elongated bumpers generally have an L-shape. The pendulum is comprised of two halves. L-shaped channels are formed in each pendulum half. The bumpers are fitted into channels of the same shape formed in the pendulum halves. When the two halves are fitted together, the L-shaped bumper is captured therebetween. Each pendulum half includes an elevated central area and a pair of recessed areas with each recessed area formed on one side of the elevated area. Side walls are formed at the intersections of the elevated area and the recessed areas. A base wall is formed along the lower edge of the elevated area. The bumper ends extend from the elevated area beyond the side walls and base wall.

16 Claims, 4 Drawing Sheets

PENDULUM CRANK BUMPER

TECHNICAL FIELD

The disclosed inventive concept relates generally to pendulum crankshafts for internal combustion engines. More particularly, the disclosed inventive concept relates to a bumper arrangement that prevents metal-to-metal impact of the pendulum assembly on the pendulum carrier by providing bumpers that cannot slip from their positions as assembled.

BACKGROUND OF THE INVENTION

Internal combustion engines having a relatively small number of cylinders provide automobile makers with an attractive solution to the need for improved fuel economy. In order to compensate for reduction of cubic capacity, vehicle manufacturers developed technologies to improve engine power, such as direct fuel injection, turbocharging, and variable timing for inlet and exhaust camshafts. In this way six- and eight-cylinder engines can be scaled down without losing available horsepower.

Undesirable consequence of engines with a small number of cylinders is high crankshaft torsional vibration and high engine block vibration caused by forces, such as first and second engine order forces, that are not cancelled. Such torsional vibrations are ultimately transmitted through the engine mounts and to the vehicle structure.

Engineers managed these vibrations to one extent or another through a variety of approaches, many of which increase the cost of construction and reduce fuel economy. One accepted solution to overcome excessive vibration is the provision of one or more pendulums on the crankshaft to lower the torsional vibration of the crankshaft and the consequent vehicle noise and harshness. Such crankshaft-mounted pendulums function as vibration absorbers as they are tuned to address and thus reduce vibrations generated by oscillating torque, thus smoothing torque output of the crankshafts. This approach is taken as well by designers of some airplane piston engines where the pendulums smooth output torque and reduce stress within the crankshaft itself.

An example of a pendulum vibration absorber associated with an engine crankshaft is set forth in U.S. Pat. No. 4,739,679, assigned to the assignee of the instant application. According to the arrangement set forth in this patent, a pendulum includes an inner curved cam follower surface that is alternately engaged and disengaged from a pin type cam fixed on the pendulum carrier.

The crankshaft pendulum is interconnected with the pendulum carrier by pairs of rollers that are movable on mating curved tracks. While there are a number of variations of the movable relationship between the pendulum and the crankshaft, it is common to incorporate rolling pins as the points of contact between these two components.

Each rolling pin requires a pendulum rolling pin track in which the rollers can roll. Known rolling pin tracks have a great distance between the walls of the track and the rolling pin. When the engine is running and the crankshaft is rotating, centrifugal force keeps the pendulum in its full out position. The pendulum responds to the oscillating torque by moving side to side. This reduces the oscillating torque to the transmission to improve noise-vibration-harness (NVH). The pendulum can hit the bumpers if the oscillating torque is too high. In this case, the pendulums would need to be detuned. The other time the pendulums hit is during start up and shut down when there is not enough centrifugal force to overcome gravity. The bumpers are intended to reduce the NVH of metal hitting metal in these three cases. In this position, the centrifugal force is sufficient to overcome gravity and the torsionals are so low as not to cause the pendulum to move back and forth. However, when the engine is turned off and rotational movement of the crankshaft stops, centrifugal motion stops as well. The pendulum, no longer held in its full out position, may move to its full travel condition in which the pendulum experiences a drop caused by gravity if the stopped position of the pendulum is "up" or is generally above the midline of the crankshaft. If the pendulum is stopped in this position, then it will drop before hitting metal-on-metal, thus increasing undesirable NVH in the engine and, consequently, in the vehicle.

To compensate for this drop, rubber bumpers are located on the pendulum or on the pendulum carrier to dampen the metal-on-metal contact. When the pendulums are over-excited or during engine start-up or shut-down, the bumpers hit their stops. In known designs, the bumpers are inserted into blind pockets formed in either the pendulum or in the pendulum carrier. Because of insufficient grip length, these bumpers are prone to falling out of their pockets, thus not only failing to achieve their intended purpose, but also creating a risk of clogged oil lines and thus causing early engine failure.

Thus a new approach to the pendulum bumpers is needed to address the problems associated with known arrangements.

SUMMARY OF THE INVENTION

The disclosed inventive concept overcomes the challenges faced by known pendulum arrangements for internal combustion engines by providing a bumper that cannot inadvertently become loose from the pendulum. Regardless of engine operation, the bumper stays attached to the pendulum.

The pendulum assembly for attachment to the crankshaft of an internal combustion engine of the disclosed inventive concept comprises a pendulum having at least one and preferably a pair of spaced apart, elongated bumpers. The elongated bumpers generally have an L-shape.

The pendulum is comprised of two halves. L-shaped channels are formed in each pendulum half. The bumpers are fitted into channels of the same shape formed in the pendulum halves. When the two halves are fitted together, the L-shaped bumper is captured therebetween.

Each pendulum half includes an elevated central area and a pair of recessed areas with each recessed area formed on one side of the elevated area. Side walls are formed at the intersections of the elevated area and the recessed areas. A base wall is formed along the lower edge of the elevated area. The bumpers are long enough so that the bumper ends extend from the elevated area beyond the side walls and base wall.

The bumpers are composed of a polymerized material including, but not limited to, natural rubber, synthetic rubber, or any other flexible and resilient material that is able to withstand oil.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
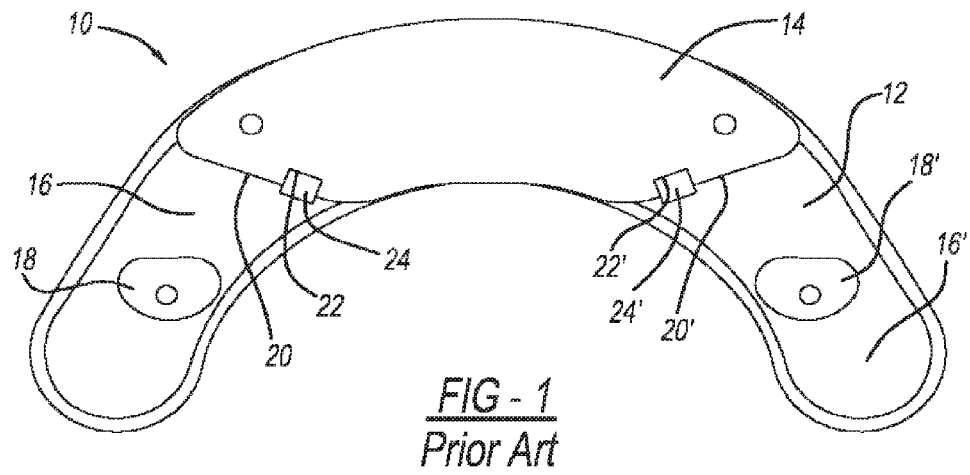
FIG. 1 is a side view of a pendulum assembly for attachment to a crankshaft according to the prior art.

In the following figures, the same reference numerals will be used to refer to the same components. In the following description, various operating parameters and components are described for different constructed embodiments. These specific parameters and components are included as examples and are not meant to be limiting.

Figure 2:
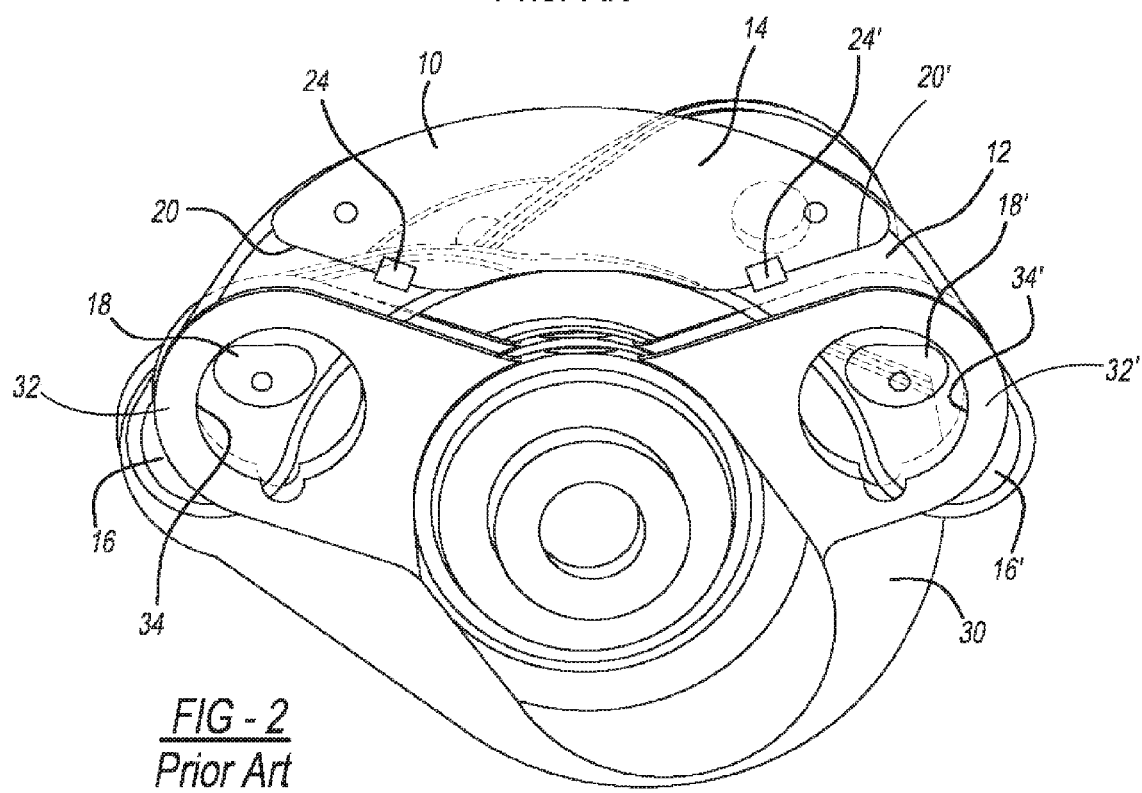
FIG. 2 is an end view of a crankshaft having the pendulum assembly of FIG. 1 attached thereto according to the prior art.

Referring to FIGS. 1 and 2, views of a known pendulum assembly and the pendulum assembly attached to a crankshaft are illustrated. Referring to FIGS. 3 through 6, the pendulum assembly according to the disclosed inventive concept is illustrated.

FIG. 1 is an end view of a pendulum assembly 10 as is known in the art for attachment to a crankshaft. The pendulum assembly 10 includes two pendulum halves, of which only a first pendulum half 12 is illustrated. A second pendulum half that is a mirror image of the pendulum half 12 is fitted over the first pendulum half 12. The first pendulum half 12 and the second pendulum half are typically attached to one another by mechanical fasteners.

The first pendulum half 12 (and the second pendulum half) includes an elevated area 14 and spaced apart recessed areas 16 and 16'. A kidney-shaped cycloid pathway 18 is formed in the recessed areas 16. A kidney-shaped cycloid pathway 18' is formed in the recessed areas 16'.

The elevated area 14 includes outer walls 20 and 20'. A rubber stop-receiving pocket 22 is formed in the outer wall 20. A rubber stop-receiving pocket 22' is formed in the outer wall 20'. A rubber stop 24 is fitted into the rubber stop-receiving pocket 22. A rubber stop 24' is fitted into the rubber stop-receiving pocket 22'.

FIG. 2 illustrates the known pendulum assembly 10 attached to a crankshaft 30. The crankshaft 30 conventionally includes a pair of spaced-apart lobes 32 and 32'. The spaced-apart lobes 32 and 32' function as a carrier for the pendulum assembly 10. Particularly, the lobe 32 includes an insert-receiving aperture 34 into which is conventionally fitted an insert (not shown) having a kidney-shaped pathway formed therein. In the same way, the lobe 32' includes an insert-receiving aperture 34' into which is conventionally fitted an insert (not shown) having a kidney-shaped pathway formed therein.

The rubber stops 24 and 24' function as bumpers to prevent the first pendulum half 12 (and the second pendulum half) from making direct, metal-on-metal contact with the spaced-apart lobes 32 and 32'. While preventing such metal-on-metal contact is desired, the rubber stops 24 and 24' are known to become separated from their rubber stop-receiving pockets 22 and 22' respectively during engine operation as discussed above. The disclosed inventive concept, discussed in detail hereinafter in relation to FIGS. 3 through 6, provides a solution to this problem.

Referring to FIGS. 3 through 6, a pendulum assembly according to the disclosed inventive concept, generally illustrated as 40, is shown. The pendulum assembly 40 includes a first pendulum half 42 and a second pendulum half 44. The first pendulum half 42 and the second pendulum half 44 are typically attached to one another by mechanical fasteners, such as a first bolt 46 and a second bolt 46'.

The first pendulum half 42 includes an elevated area 48 and a pair of spaced-apart recessed areas 50 and 50'. A kidney-shaped cycloid pathway 52 is formed in the recessed area 50. A kidney-shaped cycloid pathway 52' is formed in the recessed area 50'.

The second pendulum half 44 includes an elevated area 54 and a pair of spaced-apart recessed areas 56 and 56'. A kidney-shaped cycloid pathway 58 is formed in the recessed area 56. A kidney-shaped cycloid pathway 58' is formed in the recessed area 56'.

The pendulum assembly 40 is attached to a crankshaft (not shown) by a pendulum carrier 60. It is to be understood that the pendulum carrier 60 is one of several possible design configurations intended to connect the pendulum assembly 40 to the crankshaft. Thus the configuration of the pendulum carrier 60 as illustrated in FIGS. 3 through 6 is not intended to be limiting but is only intended as being suggestive.

The pendulum carrier 60 includes a first carrier ear 62 and a second carrier ear 62'. As shown particularly in FIG. 5, a kidney-shaped cycloid pathway 64 is formed in the first carrier ear 62 and a kidney-shaped cycloid pathway 64' is formed in the second carrier ear 62'.

The pendulum carrier 60 further includes a pair of crankshaft attachment arms 66 and 66'. The crankshaft attachment arm 66 has a bolt hole 68 formed therethrough. The crankshaft attachment arm 66' has a bolt hole 68' formed therethrough. Mechanical fasteners such as shoulder bolts 70 and 70' attach the pendulum carrier 60 to the crankshaft.

Fitted between each pendulum half 42 and 44 are rolling pins 72 and 72'. The rolling pin 72 is fitted through the kidney-shaped cycloid pathway 64 of the first carrier ear 62 of the pendulum carrier 60 and into the kidney-shaped cycloid pathway 52 of the first pendulum half 42 and into the kidney-shaped cycloid pathway 58 of the second pendulum half 44. The rolling pin 72' is fitted through the kidney-shaped cycloid pathway 64' of the second carrier ear 62' of the pendulum carrier 60 and into the kidney-shaped cycloid pathway 52' of the first pendulum half 42 and into the kidney-shaped cycloid pathway 58' of the second pendulum half 44.

The kidney-shaped rolling tracks 64 and 64' of the pendulum carrier 60 are inverted relative to the kidney-shaped rolling tracks 52 and 52' of the first pendulum half 42 and the kidney-shaped rolling tracks 58 and 58' of the second pendulum half 44. This arrangement allows the desired pendulum motion of the pendulum assembly 40 relative to the pendulum carrier 60.

Figure 3:
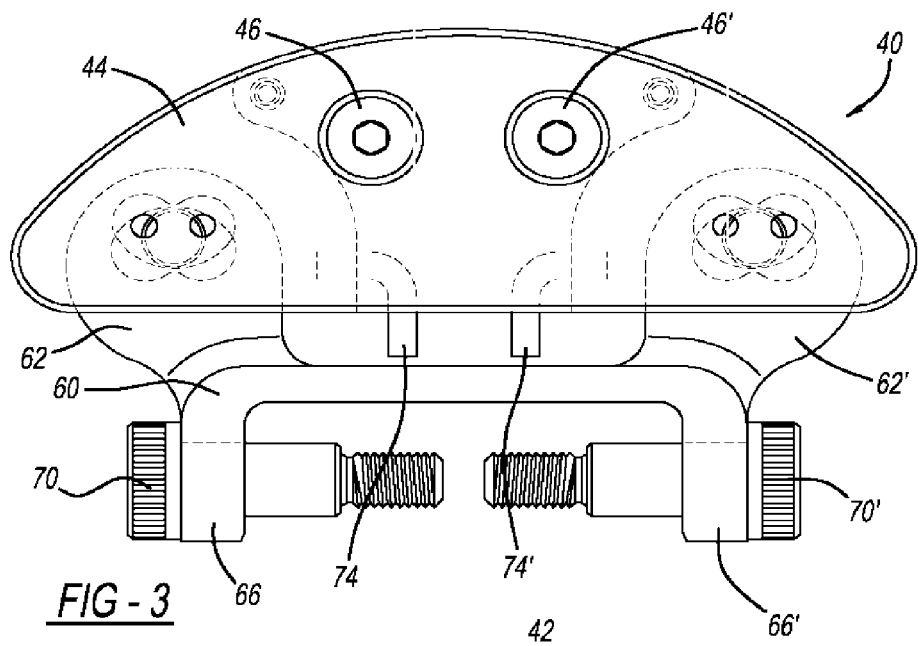
FIG. 3 is a side view of a pendulum assembly having pendulum bumpers according to the disclosed inventive concept with the pendulum shown in its full out position relative to the pendulum carrier.
Figure 4:
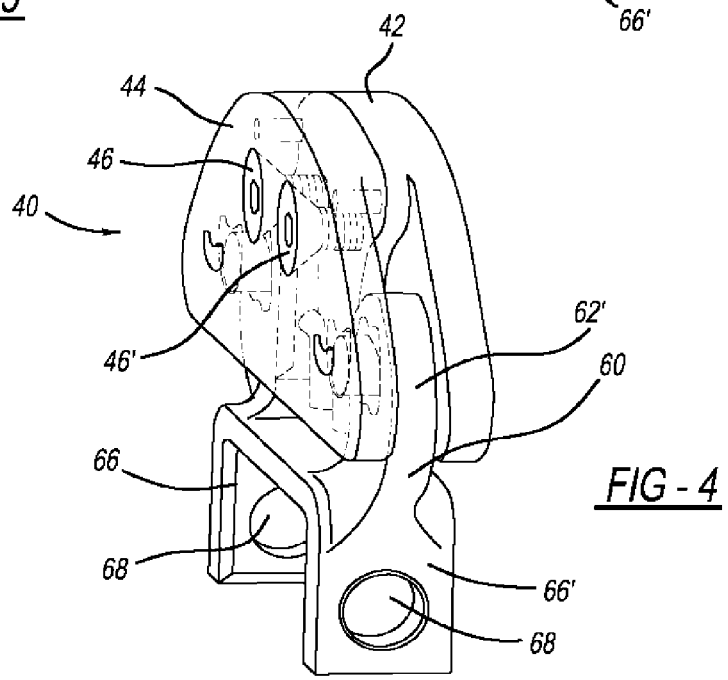
FIG. 4 is a perspective view of the pendulum assembly of FIG. 3.
Figure 5:
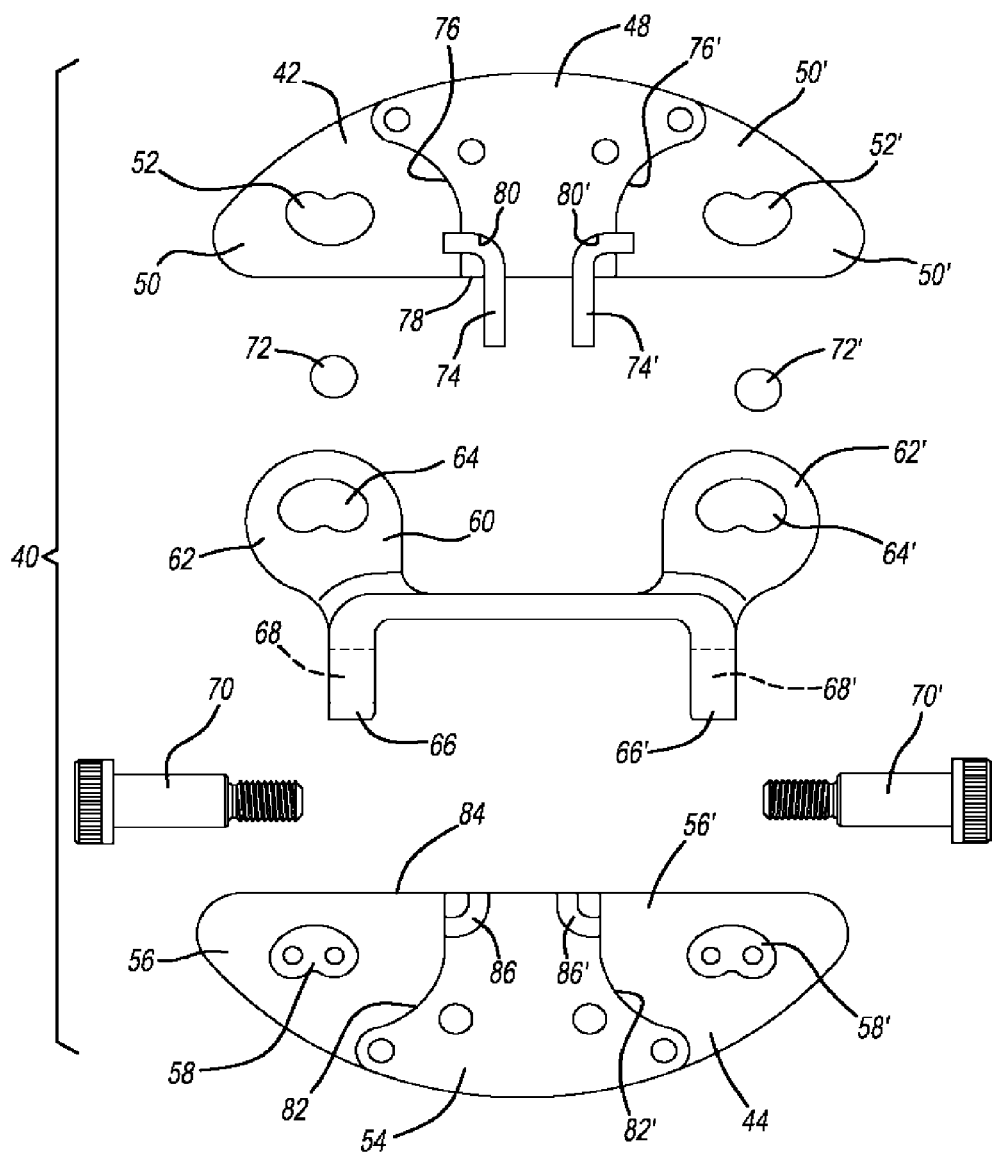
FIG. 5 is an exploded view of the pendulum assembly of FIG. 3.

FIG. 3 illustrates the pendulum assembly 40 in its full out position in which the centrifugal force is sufficient to overcome gravity and the torsionals are low so as not to cause the pendulum to move back and forth. In this position, the rolling pin 72 is centered relative to the kidney-shaped cycloid pathway 64 of the first carrier ear 62 of the pendulum carrier 60, the kidney-shaped cycloid pathway 52 of the first pendulum half 42, and the kidney-shaped cycloid pathway 58 of the second pendulum half 44. In addition, in this centered position the rolling pin 72' is centered relative to the kidney-shaped cycloid pathway 64' of the second carrier ear 62' of the pendulum carrier 60, the kidney-shaped cycloid pathway 52' of the first pendulum half 42, and the kidney-shaped cycloid pathway 58' of the second pendulum half 44. The illustrated centered position arises when centrifugal force is reduced such as during engine shut down in which the pendulum assembly 40 experiences a "drop" whereby the pendulum assembly 40 is pulled away from the pendulum carrier 60. In this position, no metal-to-metal contact between the pendulum assembly 40 and the pendulum carrier 60 is experienced.

When the centrifugal force acting upon the pendulum assembly 40 is sufficient to overcome gravity at a relatively low RPM (such as 130 RPM) and the torque oscillation is sufficient, the pendulum 44 may be moved relative to the pendulum carrier 60 from its full out condition illustrated in FIG. 3 to a full travel condition where the pendulum 44 may come into contact with the pendulum carrier 60. While this ordinarily does not happen, if the oscillating torque of the pendulum 44 is too high, it is possible for the pendulum 44 to come into contact with the pendulum carrier 60.

Figure 6:
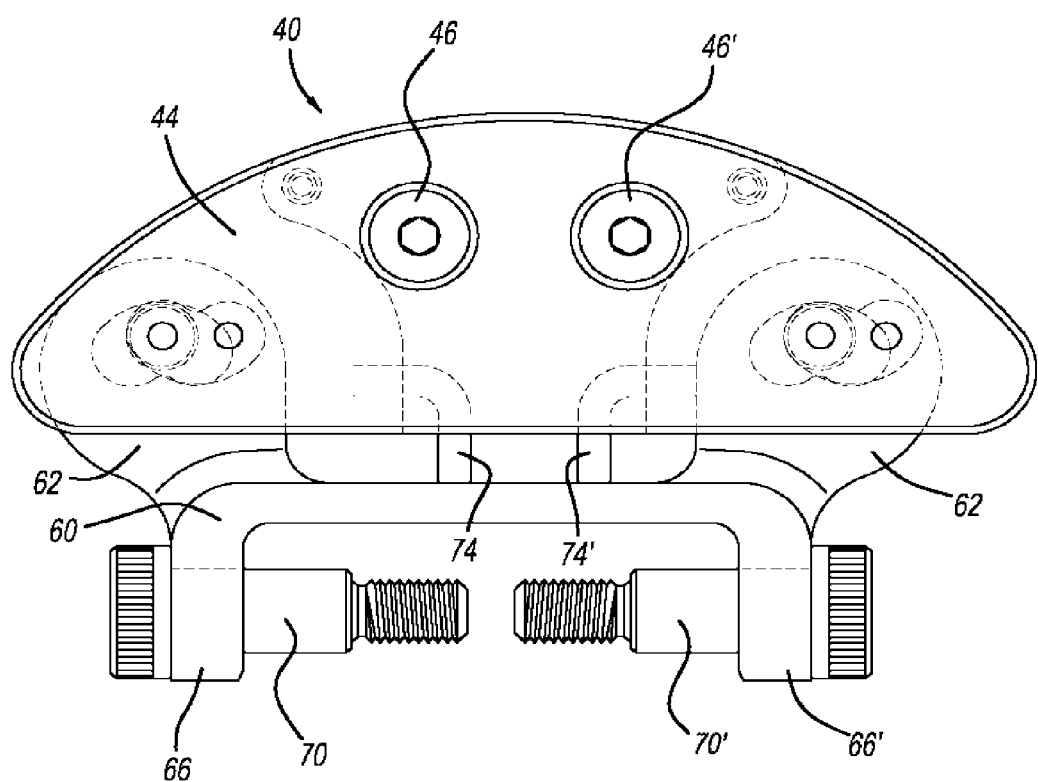
FIG. 6 is a view similar to that of FIG. 3 but illustrating the pendulum assembly moved to its full travel position relative to the pendulum carrier whereby the bumpers of the pendulum may be in contact with the pendulum carrier as illustrated.

The full travel position is illustrated in FIG. 6. In this position, the rolling pin 72 is positioned at one end of the kidney-shaped cycloid pathway 64 of the first carrier ear 62 of the pendulum carrier 60 and is at the other end of the kidney-shaped cycloid pathway 52 of the first pendulum half 42 and the kidney-shaped cycloid pathway 58 of the second pendulum half 44. In the same way, the rolling pin 72' is at one end of the kidney-shaped cycloid pathway 64' of the second carrier ear 62' of the pendulum carrier 60 and is at the other end of the kidney-shaped cycloid pathway 52' of the first pendulum half 42 and the kidney-shaped cycloid pathway 58' of the second pendulum half 44.

To avoid possible undesirable metal-to-metal contact when the pendulum 44 is in its full travel condition as shown in FIG. 6, impact-dampening elements in the form of a first angled bumper 74 and a second angled bumper 74' are provided. The first angled bumper 74 and a second angled bumper 74' are sandwiched between the first pendulum half 42 and the second pendulum half 44. The first angled bumper 74 and the second angled bumper 74' may be made of any durable and oil-resistant polymerized material, such as, but not limited, to rubber.

The elevated area 48 of the first pendulum half 42 includes a pair of side walls 76 and 76' and a base wall 78. A first bumper channel 80 and a second bumper channel 80' are formed in the elevated area 48. In the same manner, the elevated area 54 of the second pendulum half 44 includes a pair of side walls 82 and 82' and a base wall 84. A first bumper channel 86 and a second bumper channel 86' are formed in the elevated area 54.

The first angled bumper 74 is fitted in the first bumper channel 80 of the first pendulum half 42 and the first bumper channel 86 of the second pendulum half 44 such that one end of the first angled bumper 74 extends beyond the side wall 76 of the elevated area 48 and the side wall 82 of the elevated area 54 while the other end of the first angled bumper 74 extends beyond the base wall 78 of the elevated area 48 and the base wall 84 of the elevated area 54. In a like manner, the second angled bumper 74' is fitted in the second bumper channel 80' of the first pendulum half 42 and the second bumper channel 86' of the second pendulum half 44 such that one end of the second angled bumper 74' extends beyond the side wall 76' of the elevated area 48 and the side wall 82' of the elevated area 54 while the other end of the second angled bumper 74' extends beyond the base wall 78 of the elevated area 48 and the base wall 84 of the elevated area 54.

As illustrated in FIG. 6, when the pendulum assembly 40 is in its full travel condition relative to the pendulum carrier 60, the first angled bumper 74 and the second angled bumper 74' prevent metal-to-metal contact between the pendulum assembly 40 and the pendulum carrier 60. Because the angled bumpers are angled, have ends that extend beyond the side walls and base walls of the elevated areas of the pendulum halves, and are captured between the pendulum halves, the possibility that one or the other of the angled bumpers slipping from their positions as assembled is virtually eliminated by the disclosed inventive concept.

The disclosed inventive concept as set forth above overcomes the challenges faced by known pendulum crankshaft arrangements for internal combustion engines by providing an improved impact-dampening arrangement that avoids the possibility of the bumpers slipping from their positions. Accordingly, one skilled in the art will readily recognize from such discussion, and from the accompanying drawings and claims that various changes, modifications and variations can be made therein without departing from the true spirit and fair scope of the invention as defined by the following claims.

What is claimed is:

1. A pendulum crankshaft assembly for a crankshaft of an internal combustion engine comprising:
   a pendulum including an elevated area having a side wall, a base wall, and a bumper channel, said bumper channel extending through said elevated area and being encased on opposite sides thereof;
   an angled bumper fitted within said bumper channel of said pendulum, said angled bumper extending through said side wall and said base wall of said elevated area; and
   a pendulum carrier for attaching to the crankshaft; and
   a rolling pin extending through said pendulum and said pendulum carrier.

2. The pendulum crankshaft assembly of claim 1 wherein said angled bumper is L-shaped.

3. The pendulum crankshaft assembly of claim 2 including two opposed L-shaped bumpers.

4. The pendulum crankshaft assembly of claim 1, wherein said pendulum has two halves.

5. The pendulum crankshaft assembly of claim 4 wherein said bumper channel is formed in each half of said pendulum.

6. The pendulum crankshaft assembly of claim 5 wherein each half of said pendulum includes an elevated area and a recessed area.

7. A pendulum assembly for attachment to a crankshaft of an internal combustion engine comprising:
   a pendulum comprising a first half and a second half, each half having an elevated area having a side wall and a base wall, said elevated area of each half including a bumper channel formed therein and entirely encased between said elevated areas;
   a pendulum carrier for attaching to the crankshaft, said pendulum being movably attached to said pendulum carrier; and a bumper fitted in said bumper channel of each half and extending beyond said side wall and said base wall of each elevated area.

8. The pendulum assembly of claim 7 wherein said bumper is angled.

9. The pendulum assembly of claim 8 wherein said angled bumper is L-shaped.

10. The pendulum assembly of claim 7, wherein said bumper channel is a pair of separate bumper channels.

11. The pendulum assembly of claim 10, wherein said bumper is a pair of separate bumpers fitted within respective bumper channels.

12. The pendulum assembly of claim 11, wherein said bumpers extend substantially perpendicular beyond said side wall and said base wall of said elevated area.

13. A pendulum assembly for a crankshaft of an engine comprising:
   a pendulum including an elevated area having a side wall, a base wall, and a bumper channel formed therein, said bumper channel having a first end extending through said side wall and a second end extending through said base wall;
   a bumper having a first end and a second end, said bumper being fitted within said bumper channel, said first end and said second end of said bumper extending substantially perpendicularly beyond said side wall and said base wall, respectively, of said elevated area; and
   a pendulum carrier for attaching to the crankshaft, said pendulum being movably attached to said pendulum carrier.

14. The pendulum assembly of claim 13, wherein said bumper is angled.

15. The pendulum assembly of claim 13, wherein said bumper channel is a pair of separate bumper channels.

16. The bumper assembly of claim 15, wherein said bumper is a pair of separate bumpers fitted within respective bumper channels.

* * * * *